No. 615,367. Patented Dec. 6, 1898.
J. C. SATTES.
NUT LOCK.
(Application filed Feb. 9, 1898.)
(No Model.)

Witnesses
C. J. Young.
H. B. Shepard.

John C. Sattes Inventor:-
By his Attorneys,
C. A. Snow & Co.

UNITED STATES PATENT OFFICE.

JOHN C. SATTES, OF ST. ALBANS, WEST VIRGINIA, ASSIGNOR OF ONE-HALF TO E. C. COLCORD, OF SAME PLACE.

NUT-LOCK.

SPECIFICATION forming part of Letters Patent No. 615,367, dated December 6, 1898.

Application filed February 9, 1898. Serial No. 669,705. (No model.)

*To all whom it may concern:*

Be it known that I, JOHN C. SATTES, a citizen of the United States, residing at St. Albans, in the county of Kanawha and State of West Virginia, have invented a new and useful Nut-Lock, of which the following is a specification.

This invention relates to nut-locks, and has for its object to provide such a device as will readily and effectively prevent the accidental loosening of the nut and bolt by the jarring or movement of machinery and the like.

The essential features of my invention comprise a spiral spring-washer mounted between two non-resilient washers, one of the washers locking one extremity of the spring-washer against the threads of the bolt, while the other washer encircles the said spring-washer and relieves the same from the pressure of the nut, which is provided with a ratchet-face to engage with the other extremity of the spring-washer, and thus effectively lock the nut upon the bolt. These and other features and advantages of a nut-lock constructed in accordance with my invention will be hereinafter more fully described, and particularly pointed out in the appended claims.

Figure 1:
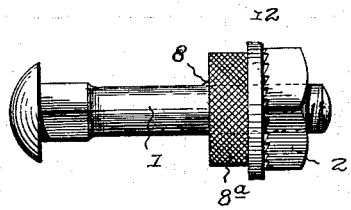
Figure 2:
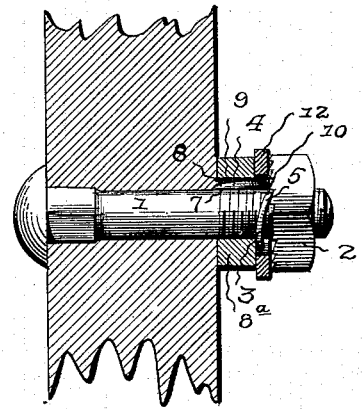
Figure 3:
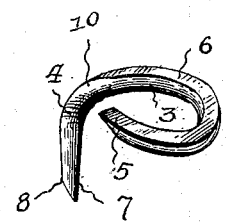
Figure 6:
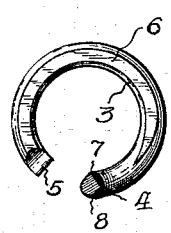
Figure 4:
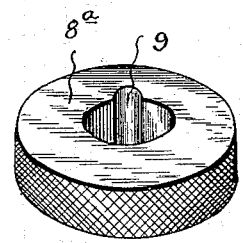
Figure 5:
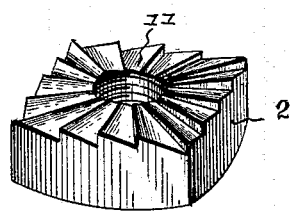

In the drawings, Figure 1 is a side elevation of a bolt and nut provided with my improvements. Fig. 2 is a longitudinal sectional view thereof. Fig. 3 is an enlarged detail perspective view of the spring-washer. Fig. 4 is an enlarged detail perspective view of the slotted washer. Fig. 5 is a perspective view showing the ratchet-face of the nut. Fig. 6 is an underneath plan view of the spiral spring-washer, showing the locking-arm in cross-section.

Corresponding parts in the several figures are denoted by like characters of reference.

Referring to the drawings, 1 designates an ordinary threaded bolt, having the usual nut 2 screwed thereon, while 3 designates the spiral spring locking-washer. This washer is made of spring metal and is bent into an approximate circular body of a size sufficient to just encircle the bolt and easily slip thereon without binding. One extremity 4 of this washer is bent at an approximate right angle to the plane of the body thereof, while the opposite extremity is slightly bent in the opposite direction and beveled or shouldered to form a spring ratchet-tongue 5. The circular body portion of this washer between the spring-tongue 5 and the other extremity 4 is flattened or made smaller, as at 6, for a purpose which will be hereinafter fully explained. The arm formed by the bent extremity 4 is used to lock the washer upon the bolt and is beveled to furnish a sharp edge 7 upon its inner face next to the bolt, while the opposite face 8 is rounded in cross-section and beveled downwardly from top to point, forming a wedge-shaped locking-arm.

The spring locking-washer is held from turning upon the bolt by means of a washer $8^a$, which is provided with a slot or groove 9 in the face of the smooth bore thereof and adapted to receive the locking-arm 4. This washer is of a thickness equal to the length of the locking-arm, and thus completely incloses and protects the same.

When using my improvements upon rail-joints, the washer $8^a$ may be dispensed with, and a suitable slot provided in the fish-plate will serve the purpose thereof, as will be readily understood.

Upon screwing the nut upon the bolt until it engages with the thickest portion of the spiral spring-washer 3 at 10 the said washer is pressed down and the arm 4 is forced into the groove 9 in the heavy washer $8^a$, and by reason of its wedge shape presses the sharp edge 7 into the threads of the bolt, and thus prevents the spring-washer from turning with the nut, while the spring-tongue 5 engages with the ratchet-face 11 of the under face of the nut, which effectually prevents the nut from accidental displacement.

To prevent the spiral spring-washer from losing its resiliency by reason of being held flattened out by the pressure of the nut, I provide another washer 12, placed between the washer $8^a$ and the nut. This washer is provided with a bore of sufficient size to encircle the spring-washer and large enough to allow for any expansion caused by the pressure of the nut, while its thickness is such as to hold the nut away from engagement with the spring-washer except at its spring-tongue 5 and at the portion 10, where it is bent to form the locking-arm 4. By this arrangement it will be readily understood how the nut acts upon the spring-washer to force the arm 4 thereof into engagement with the threads of the bolt and how it is relieved of any pressure which might destroy the resiliency thereof.

I am aware that guards have been employed to prevent destroying the resiliency of a spring locking-washer, but believe that my combination with the peculiarly-formed spring-washer and the use of a slotted washer to lock the said spring-washer upon the bolt to be a new and useful arrangement in the art.

Having thus described my invention, I claim and desire to secure by Letters Patent—

1. A nut-lock, comprising a spring locking-washer, having one extremity formed to engage the nut, and the other extremity bent at an approximate right angle to the plane of the body of the washer, forming a locking-arm, having its face next the bolt formed into a sharp rib, and means for forcing said rib into the threads of the bolt, thereby locking the spring-washer thereon, substantially as shown and described.

2. A nut-lock, comprising a spring-washer, having one extremity bent to form a spring-tongue to engage the nut, the other extremity thereof bent in the opposite direction and at an approximate right angle to the plane of the body of the washer, forming a locking-arm provided with a sharp edge next the bolt, and beveled or wedge-shaped from top to point, a washer having a groove in the face of its bore and adapted to receive the locking-arm of the spring-washer, and a guard arranged to encircle the spring-washer and receive the pressure of the nut, substantially as shown and described.

3. A nut-lock, comprising a spring locking-washer, having one extremity formed to engage the nut, the other extremity thereof being projected at an angle to the plane of the body of the washer, and means for holding the angled end of the washer in engagement with the threads of the bolt, substantially as shown and described.

4. A nut-lock, comprising a spring locking-washer, having one extremity formed to engage the nut, the other extremity being projected at an angle to the plane of the body of the spring-washer, and means for holding the angled end of the washer in engagement with the threads of the bolt, said means comprising a washer, having a groove to receive the angled end of the spring-washer, substantially as shown and described.

5. A nut-lock, comprising a spring locking-washer, having one extremity formed to engage the nut, the other extremity being projected at an angle to the plane of the body of the washer, a washer encircling the angled end of the spring-washer to hold it in engagement with the threads of the bolt, and a guard to encircle the body of the spring-washer, and to receive the pressure of the nut, substantially as and for the purpose set forth.

In testimony that I claim the foregoing as my own I have hereto affixed my signature in the presence of two witnesses.

JOHN C. SATTES.

Witnesses:
E. E. WAY,
W. A. BERRY.